(12) United States Patent
Mills (10) Patent No.: US 12,410,077 B1
(45) Date of Patent: Sep. 9, 2025

(54) METHODS, SYSTEMS, AND COMPOSITIONS FOR OXIDATION OF A SUBSTRATE

(71) Applicant: SUDOC, LLC, Edinburg, VA (US)

(72) Inventor: Matthew Mills, Glenshaw, PA (US)

(73) Assignee: SUDOC, LLC, Edinburg, VA (US)

( * ) Notice: Subject to any disclaimer, the term of this patent is extended or adjusted under 35 U.S.C. 154(b) by 0 days.

(21) Appl. No.: 18/849,873

(22) PCT Filed: May 3, 2024

(86) PCT No.: PCT/US2024/027594
§ 371 (c)(1),
(2) Date: Sep. 23, 2024

(87) PCT Pub. No.: WO2024/258519
PCT Pub. Date: Dec. 19, 2024

Related U.S. Application Data (60) Provisional application No. 63/508,701, filed on Jun. 16, 2023.

(51) Int. Cl.
C02F 1/467 (2023.01)
C02F 1/461 (2023.01)
C02F 101/30 (2006.01)
C02F 101/34 (2006.01)
C02F 101/38 (2006.01)
C02F 103/34 (2006.01)

(52) U.S. Cl.
CPC ........ C02F 1/4672 (2013.01); C02F 1/46104 (2013.01); C02F 2101/308 (2013.01); C02F 2101/34 (2013.01); C02F 2101/38 (2013.01); C02F 2103/343 (2013.01); C02F 2305/02 (2013.01)

(58) Field of Classification Search
CPC .................................................... C02F 1/4672
See application file for complete search history.

(56) References Cited

U.S. PATENT DOCUMENTS

| | | | |
|---|---|---|---|
| 5,952,542 A * | 9/1999 | Steele | A62D 3/11 205/687 |
| 6,054,580 A * | 4/2000 | Collins | C07F 15/0026 540/465 |
| 10,926,248 B2 * | 2/2021 | Collins | B01J 31/1835 |
| 11,465,136 B2 | 10/2022 | Berry et al. | |
| 2002/0050451 A1 | 5/2002 | Ford et al. | |

(Continued)

FOREIGN PATENT DOCUMENTS

EP 2064367 A1 6/2009
WO 2008034634 A1 3/2008

OTHER PUBLICATIONS

English translation of CN 112624274 (Year: 2021).*

(Continued)

*Primary Examiner* — Luan V Van
(74) *Attorney, Agent, or Firm* — K&L Gates LLP (57) ABSTRACT

Methods, systems, and compositions for oxidation are provided. The method comprises combining a macrocyclic ligand and metal complex catalyst, an electrolyte, the substrate, and water to form an aqueous composition. The method comprises applying an electrical voltage to the aqueous composition and oxidizing the substrate in the presence of the catalyst.

21 Claims, 2 Drawing Sheets

(56) References Cited

U.S. PATENT DOCUMENTS

| | | | |
|---|---|---|---|
| 2011/0094043 A1 | 4/2011 | Ghosh et al. | |
| 2020/0321630 A1* | 10/2020 | Basheer | H01M 4/9075 |
| 2021/0086171 A1* | 3/2021 | Collins | B01J 31/1835 |
| 2024/0166538 A1* | 5/2024 | Madsen | C02F 1/4698 |

OTHER PUBLICATIONS

Lin et al, First-Row Transition-Metal Complexes with Tetra-Amido Macrocyclic Ligands for Water and C(sp3)—H Bond Oxidation: Performance Benchmarking Using Free Energy Relationships, ChemCatChem 2024, 16, e202301375. https://doi.org/10.1002/cctc.202301375 (Year: 2024).*

Warner, Genoa R., et al. "Bioinspired, multidisciplinary, iterative catalyst design creates the highest performance peroxidase mimics and the field of sustainable ultradilute oxidation catalysis (SUDOC)." ACS Catalysis 9.8 (2019): 7023-7037 (Year: 2019).*

Beach, Evan S., et al. "Activation of hydrogen peroxide by an Fe-TAML complex in strongly alkaline aqueous solution: homogeneous oxidation catalysis with industrial significance." Industrial & engineering chemistry research 48.15 (2009): 7072-7076 (Year: 2009).*

Ellis, W. Chadwick, et al. "Fast water oxidation using iron." Journal of the American Chemical Society 132.32 (2010): 10990-10991 (Year: 2010).*

International Search Report and Written Opinion of the International Searching Authority for International Application No. PCT/US24/27594 mailed Jul. 31, 2024.

* cited by examiner

METHODS, SYSTEMS, AND COMPOSITIONS FOR OXIDATION OF A SUBSTRATE

This Application is a national stage application of PCT/US24/27594, filed May 3, 2024, which claims priority to provisional Application No. 63/508,701.

FIELD

The present disclosure relates to methods, systems, and compositions for oxidation of a substrate.

BACKGROUND

Electrochemical oxidation has been used for treating concentrated waste streams containing organic and inorganic compounds. However, typical electrochemical oxidation system present challenges.

SUMMARY

In one aspect, the present disclosure provides a method for oxidation of a substrate. The method comprises combining a metal complex catalyst, an electrolyte, the substrate, and water to form an aqueous composition. The method comprises applying an electrical voltage to the aqueous composition and oxidizing the substrate in the presence of the catalyst.

In another aspect, the present disclosure provides an aqueous composition for oxidation.

It is understood that the inventions described in this specification are not limited to the examples summarized in this Summary. Various other aspects are described and exemplified herein.

BRIEF DESCRIPTION OF THE DRAWINGS

The features and advantages of the examples, and the manner of attaining them, will become more apparent and the examples will be better understood by reference to the following description of examples taken in conjunction with the accompanying drawings, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Certain exemplary aspects of the present disclosure will now be described to provide an overall understanding of the principles of the composition, function, manufacture, and use of the compositions and methods disclosed herein. One or more examples of these aspects are illustrated in the accompanying drawing. Those of ordinary skill in the art will understand that the compositions and methods specifically described herein are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

Typically, large quantities of electrolyte and high current densities have been used to oxidize substrates in waste streams through electrochemical reactions. However, these prior processes can be inefficient, costly, and may require significant remediation efforts for waste streams. Thus, the present disclosure provides methods, apparatus, and compositions for oxidation of substrates that can reduce the reaction temperature, reduce the concentration of electrolyte, reduce the need for oxidant, reduce the current density used and/or the size of the electrodes needed.

The method for oxidation of a substrate according to the present disclosure can comprise combining a metal complex catalyst, an electrolyte, a substrate, and water to form an aqueous composition. The combining can comprise mixing the materials together in a vessel. In various examples, the catalyst, electrolyte, and/or substrate are first combined with water prior to combining with the other materials. For example, the substrate and/or electrolyte can be combined with water prior to adding the catalyst. Additional water may be added to the process as necessary.

The substrate can be present in a waste stream, such as, for example, an aqueous waste stream. The aqueous waste stream can comprise textile dye wastewater, a pharmaceutical waste stream, an oil and gas waste stream, a remediation stream, and/or other waste stream type. In various examples, at least a portion of the electrolyte can be present in the aqueous waste stream. The combining can comprise adding the catalyst to the aqueous waste stream and optionally water and/or electrolyte, depending on the water content and/or conductivity of the aqueous waste stream.

The catalyst can be added in an amount to achieve a concentration in the aqueous composition in a range of 10 nM to 100 µM of the catalyst, such as, for example, 20 nM to 50µ, 100 µM to 50 µM, 0.5 µM to 50 µM catalyst, 0.5 µM to 25 µM catalyst, 0.5 µM to 25 µM catalyst, or 0.5 µM to 10 µM catalyst. The catalyst can be provided as an aqueous composition, a slurry, a powder, granules, and/or a tablet.

The catalyst can comprise four N-groups bonded to the metal. The N-groups are nitrogen containing groups selected from the group consisting of amide, sulfonamide, and phosphoramide. The nitrogen in the N-groups can be directly bonded to the metal. In various examples, the N-groups comprises at least one nitrogen containing group selected from the group consisting of sulfonamide and phosphoramide. In certain examples, the catalyst can comprise a diamido-disulfonamide macrocyclic ligand and metal complex and/or a tetrasulfonamide macrocyclic ligand and metal catalyst. The catalyst can comprise a catalyst as described in U.S. Pat. Nos. 7,060,818 and/or 10,926,248, which are hereby incorporated by reference in their entirety. The metal in the catalyst can be a transition metal, such as, for example, iron, manganese, cobalt, and/or copper. For example, the metal in the catalyst can be iron and/or manganese. In various examples, the catalyst can comprise at least one of the following structures 1-6:

Structure 1

Structure 2

Structure 3

Structure 4

Structure 5

Structure 6

The electrolyte can be added in an amount to achieve a conductivity in the aqueous composition in a range of 0.1 μS to 100 mS, such as, for example, 1 μS/cm to 50 mS/cm, 1 μS/cm to 3 mS/cm, 1 μS/cm to 2 mS/cm, 1 μS/cm to 1 mS/cm, 1 μS to 900 μS/cm, 5 μS/cm to 800 μS/cm, 25 μS/cm to 700 μS/cm, 20 μS/cm to 600 μS/cm, 50 μS/cm to 500 μS/cm, 50 μS/cm to 400 μS/cm, 50 μS/cm to 100 μS/cm, or 100 μS/cm to 400 μS/cm. In various examples, the electrolyte can be present in an amount of 10 mg/L to 5000 mg/L, such as, for example 100 mg/L to 4000 mg/L, 500 mg/L to 3000 mg/L, or 1000 mg/L to 2500 mg/L. Conductivity can be measured with a conductivity meter, such as, for example, an Orion Star 212 Conductivity Benchtop Meter available from ThermoFisher, Waltham, MA, USA.

The use of the catalyst can enable a reduced amount of electrolyte to be present during the oxidation. For example, the catalyst can participate in the oxidation reaction by facilitating electron transfer from the working electrode to the substrate by acting as a catalytic intermediate. The oxidized catalyst can then oxidize the substrate.

The electrolyte can comprise a salt, such as, for example, a halogen salt, a sulfate salt, a phosphate salt, a nitrate salt, and/or a carbonate salt. For example, the electrolyte can comprise sodium chloride, sodium sulfate, and/or sodium phosphate. In various examples, the electrolyte can be sodium chloride, and the oxidant produced during the oxidation can be chlorine, which can be converted to hypochlorite and/or hypochlorous acid. In certain examples, the electrolyte can comprise a sulfate salt, and the oxidant produced during the oxidation can be peroxodisulfate. In various examples, other oxidants can be generated at the working electrode (e.g., anode, cathode) under electrochemical conditions such as, for example, ozone, hydrogen peroxide, and/or hydroxyl radicals. In various examples, the oxidant can be produced during the oxidation and the oxidant can activate the catalyst and the oxidized catalyst can then oxidize the substrate.

The substrate can be added in an amount to achieve a concentration in the aqueous composition in a range of 0.001 mg/L to 100,000 mg/L, such as, for example, 1 mg/L to 10,000 mg/L, 5 mg/L to 1,000 mg/L, or 10 mg/L to 100 mg/L. The substrate can comprise an organic compound, such as, for example, a textile dye or an active pharmaceutical ingredient.

Water can be added in an amount to achieve a concentration in the aqueous composition of least 50% by weight based on the total weight of the composition, such as, for example, at least 55% by weight, at least 60% by weight, at least 70% by weight, at least 80% by weight, or at least 90% by weight of water, all based on the total weight of the aqueous composition.

Optionally, an additional reagent can be added to the aqueous composition for enhancing scouring, dispersion, wetting, alkalinity, salinity, and/or buffering capacity of the aqueous composition. For example, the additional reagent can comprise a wetting agent, a surfactant, denaturing agent, co-solvent, and/or a buffer.

The method can comprise applying an electrical voltage to the aqueous composition and oxidizing the substrate in the presence of the catalyst in the aqueous composition. In various examples, the oxidized substrate can be broken down, decolorized, reduced in toxicity, reduced in chemical and/or biological oxygen demand to further process the substrate and/or other chemical modification. The method can be performed as a batch process, a continuous process, or a semi-batch process.

Figure 1:
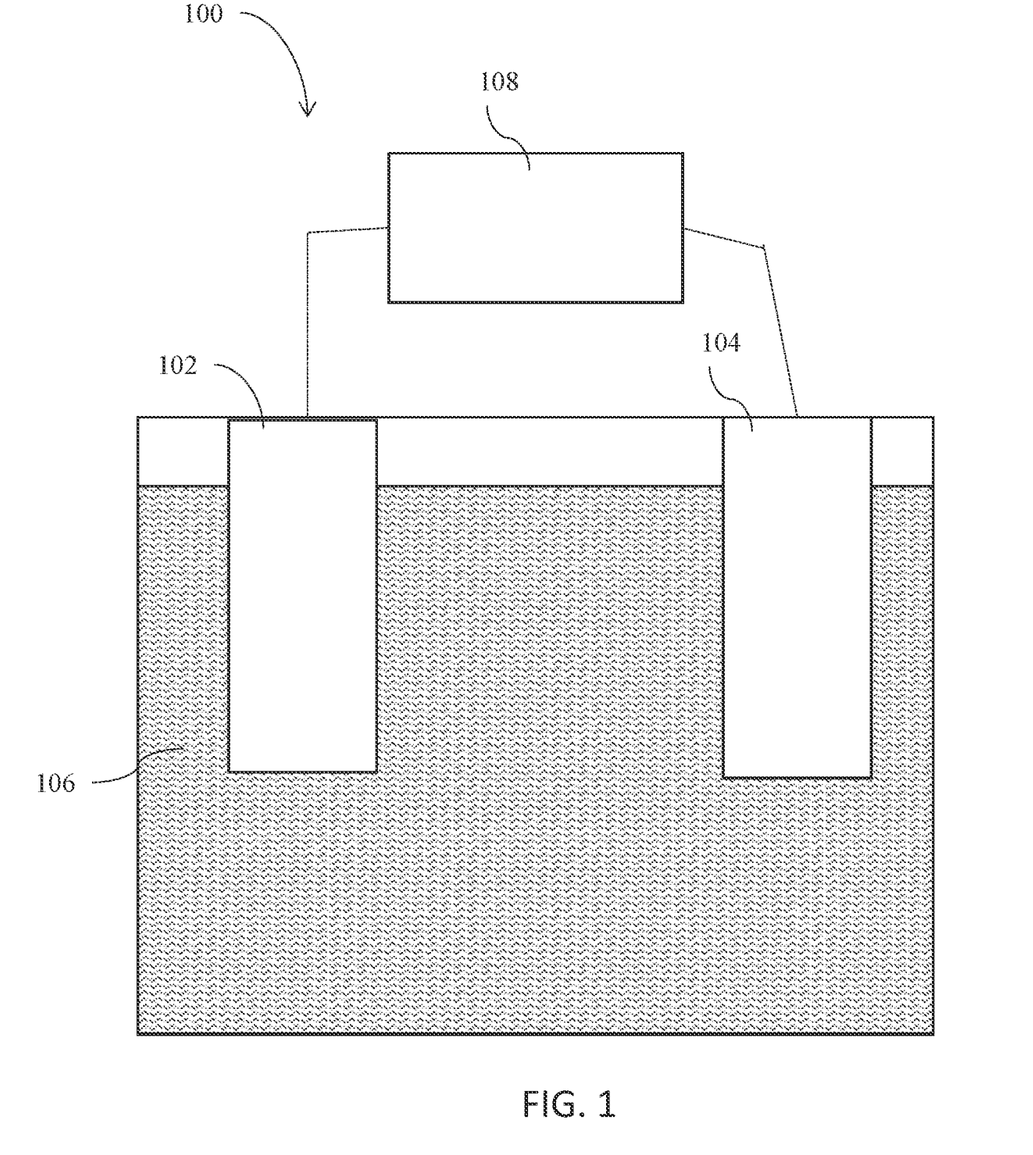
FIG. 1 is a schematic diagram of an electrolysis cell according to the present disclosure.

The method can comprise introducing the aqueous composition into an electrolysis cell, such as, for example, electrolysis cell 100 as illustrated in the Figure. The electrolysis cell 100 can comprise an anode 102 and a cathode 104 and the electrical voltage can be applied with the anode 102 and the cathode 104. The aqueous composition 106 can be disposed in contact with the anode 102 and the cathode 104. The anode 102 and the cathode 106 can be in electrical communication with a power supply 108, such as, for example, a DC power supply. The electrolysis cell 100 can be configured to operate in a batch mode, continuous mode, or semi-continuous mode depending on the configuration of the electrolysis cell 100. For example, the aqueous composition 106 can be added to the electrolysis cell 100 at a single time or the aqueous composition can be continuously cycled through the electrolysis cell 100 with a pump. The method could also comprise a series of electrode pair through which the aqueous composition travels.

The electrical voltage can be applied at a sufficient level to facilitate oxidation of the substrate, such as, for example, a sufficient level to activate the catalyst and/or generate oxidant from the electrolyte. An electrical current can be applied to the aqueous composition to achieve a current density in the aqueous composition in a range of greater than 0 to 500 mA/cm$^2$, such as, for example, 1 mA/cm$^2$ to 100 mA/cm$^2$, 1 mA/cm$^2$ to 50 mA/cm$^2$, 1 mA/cm$^2$ to 25 mA/cm$^2$, or 1 mA/cm$^2$ to 10 mA/cm$^2$. The current density is based on the current applied to the working electrode and the surface area of the working electrode.

During oxidation, the aqueous composition can be at a temperature in a range of 0° C. to 95° C., such as, for example, 5° C. to 90° C., 5° C. to 70° C., 5° C. to 50° C., 10° C. to 50° C., 10° C. to 45° C., or 15° C. to 45° C. The use of the catalyst can enable a reduced temperature for the oxidation, which can reduce the energy requirements for the process.

During oxidation, the pH of the aqueous composition can be in a range of 4 to 13, such as, for example, 4 to 11, 4 to 10, 5 to 9, 5.5 to 8.5, 6 to 8, or 6.2 to 7.8.

In various examples, the aqueous composition is oxidant free prior to applying the voltage and any oxidant present may be generated by the applied electrical voltage. Oxidant free means that the aqueous composition comprises no greater than 0.1% by weight oxidant, such as, for example, no greater than 0.05% by weight oxidant, no greater than 0.01% by weight oxidant, or no greater than 0.001% by weight oxidant. The aqueous composition can comprise no intentionally added oxidant.

The present disclosure also provides an aqueous composition for oxidation of a substrate. The aqueous composition can comprise a catalyst, an electrolyte, and water.

EXAMPLES

The present disclosure will be more fully understood by reference to the following examples, which provide illustrative non-limiting aspects of the invention. It is understood that the invention described in this specification is not necessarily limited to the examples described in this section.

Aqueous Composition Preparation Procedure

Multiple aqueous compositions were prepared with varying amounts of electrolyte and catalyst. For each composition, deionized water was added to a glass beaker with a stir bar and placed on a stir plate to provide constant mixing. Then, an electrolyte, a substrate of Orange II dye (4-(2-Hydroxy-1-naphthylazo)benzenesulfonic acid sodium salt), and, if present, a metal complex catalyst were added and mixed together. The metal in the catalyst was iron. Orange II dye was used as a surrogate for other substrates as quantifying the oxidation of Orange II dye was simpler to perform.

Electrolysis Cell Configuration

An electrolysis cell was prepared for applying an electric voltage to each aqueous composition. The electrolysis cell was configured according to FIG. 1 and included placing a boron-doped diamond anode and a titanium based cathode with a 13 mm electrode gap into the glass beaker that the solution was prepared in. The anode included a surface area of 8.1 cm$^2$ and the cathode included a surface area of 19 cm$^2$. The cathode and anode were connected to a three-electrode potentiostat for control and monitoring of system voltage, system current, and electrode (anode) potential in reference to a Ag/AgCl reference-electrode. The reference-electrode was suspended in the glass beaker such that it is within 2 mm of the anode surface. The experiments were conducted either in potentiostatic mode (controlled anode potential) or galvanstatic (controlled current) mode.

Measurement Procedure

The aqueous composition was pumped from the glass beaker through an inline ultraviolet-visible wavelength spectrophotometer (UV-VIS Spec) using a peristaltic pump at a flow rate of 100 mL/min and at ambient temperature (e.g., 20 degrees Celsius+/−2 degrees Celsius). This was pumped through an electrochemical cell with a volume of 0.25 mL across an anode with a surface area of 4.5 cm$^2$. The UV-Vis spec measured absorbance of the aqueous composition in a wavelength range of 200 to 600 nanometers (nm) as the aqueous composition was pumped through the cell over 15 minutes. The change in the absorbance at 484 nm was used to infer degradation of Orange II dye using molar absorptivity calculations that are governed by the Beer-Lambert Law, also referred to as Beer's Law.

| Example | Electrolyte | Electrolyte Conc. (µM) | Conductivity (µS/cm) | pH | Catalyst Conc. (µM) | Orange II Conc. (µM) | Voltage (V) | Amperage (A) | Orange II Degradation | EEO | Percent Reduction |
|---|---|---|---|---|---|---|---|---|---|---|---|
| 1 | NaCl | 2,570 | 325 | 6.4 | 0 | 50 | 25 | 0.55 | 11% | 45.3 | |
| 2 | NaCl | 2,570 | 324 | 6.4 | 1 | 50 | 25 | 0.55 | 46% | 8.6 | 81% |
| 3 | NaCl | 25,700 | 2,906 | 8.4 | 0 | 50 | 25 | 0.55 | 67% | 4.8 | |

-continued

| Example | Electrolyte | Electrolyte Conc. (μM) | Conductivity (μS/cm) | pH | Catalyst Conc. (μM) | Orange II Conc. (μM) | Voltage (V) | Amperage (A) | Orange II Degradation | EEO | Percent Reduction |
|---|---|---|---|---|---|---|---|---|---|---|---|
| 4 | NaCl | 25,700 | 2,911 | 8.4 | 1 | 50 | 25 | 0.55 | 97% | 1.5 | 68% |
| 5 | Na$_2$SO$_4$ | 1,410 | 300 | ~7-9 | 0 | 50 | 25 | 0.6 | 9% | 61.0 | |
| 6 | Na$_2$SO$_4$ | 1,410 | 300 | ~7-9 | 1 | 50 | 25 | 0.6 | 13% | 41.3 | 32% |
| 7 | Na$_2$SO$_4$ | 14,100 | 3,000 | ~7-9 | 0 | 50 | 25 | 0.6 | 32% | 14.9 | |
| 8 | Na$_2$SO$_4$ | 14,100 | 3,000 | ~7-9 | 1 | 50 | 25 | 0.6 | 55% | 7.2 | 52% |
| 9 | Na$_2$SO$_4$ | 14,100 | 3,000 | ~7-9 | 0 | 50 | 32 | 0.6 | 44% | 12.7 | |
| 10 | Na$_2$SO$_4$ | 14,100 | 3,000 | ~7-9 | 1 | 50 | 32 | 0.6 | 68% | 6.5 | 49% |

Figure 2:
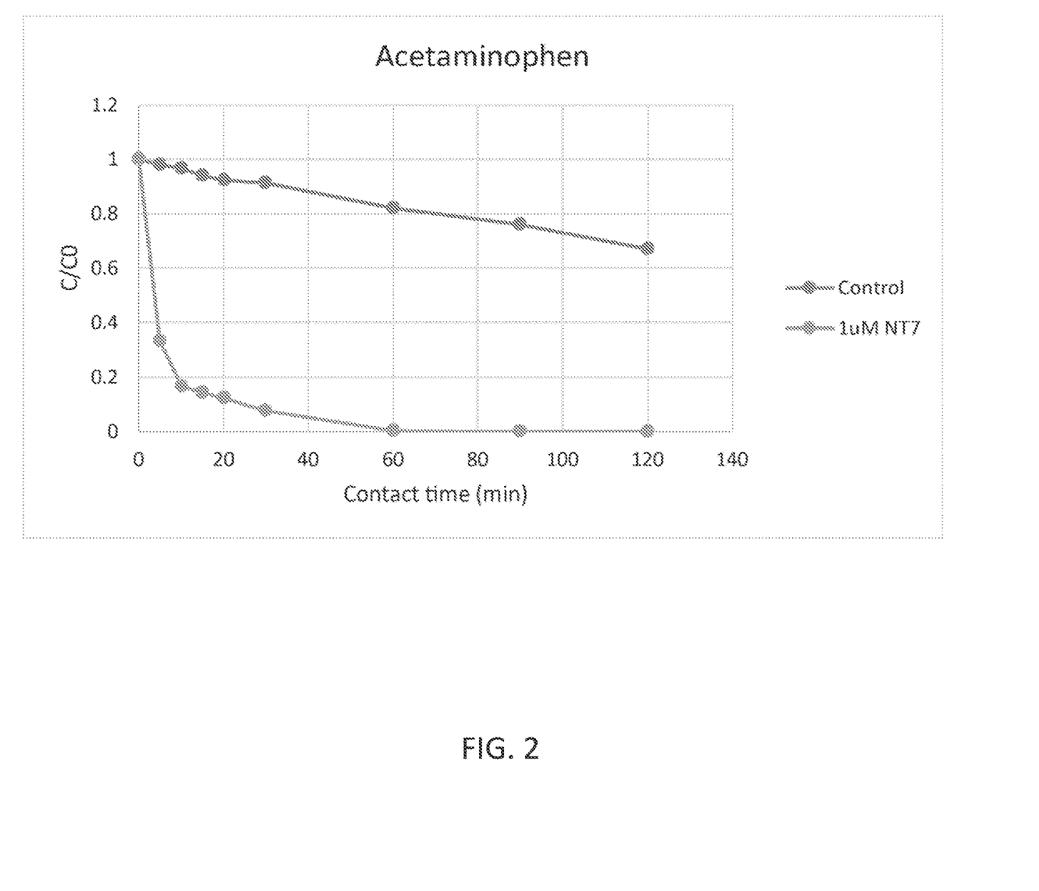
FIG. 2 is a graph of the concentration of acetaminophen measured by LC-MS/MS and the data was plotted to measure rates of degradation.

An aqueous composition consisting of 150 mL of 20 mM phosphate buffer at pH 7.9, 0.5 mg/L acetaminophen, and 0 or 1 μM catalyst was added to an electrochemical reactor. The electrochemical cell consisted of a 12 cm$^2$ boron-doped diamond anode and titanium cathode. The current density of the cell was set to 10 mA cm$^{-2}$. The reaction mixture was agitated by magnetic stirring at a rate of 400 rpm. The concentration of acetaminophen was measured by LC-MS/MS and the data was plotted to measure rates of degradation as shown in FIG. 2.

Various aspects of the invention according to the present disclosure include, but are not limited to, the aspects listed in the following numbered clauses.

Clause 1. A method for oxidation of a substrate, the method comprising: combining a macrocyclic ligand and metal complex catalyst, an electrolyte, the substrate, and water to form an aqueous composition; and applying an electrical voltage to the aqueous composition and oxidizing the substrate in the presence of the catalyst.

Clause 2. The method of clause 1, wherein the electrolyte is added in an amount to achieve a conductivity in the aqueous composition in a range of 0.1 μS/cm to 100 mS/cm.

Clause 3. The method of clause 1, wherein the electrolyte is added in an amount to achieve a conductivity in the aqueous composition in a range of 50 μS/cm to 100 μS/cm.

Clause 4. The method of any of clauses 1-3, wherein the electrolyte comprises a salt.

Clause 5. The method of any of clauses 1-4, wherein the electrolyte comprises a halogen salt, a sulfate salt, a phosphate salt, a nitrate salt, and/or a carbonate salt.

Clause 6. The method of any of clauses 1-5, wherein the electrolyte comprises sodium chloride, sodium sulfate, sodium phosphate, or a combination thereof.

Clause 7. The method of any of clauses 1-6, wherein the substrate comprises organic compounds.

Clause 8. The method of any of clauses 1-7, wherein the substrate comprises inorganic compounds.

Clause 9. The method of any of clauses 1-8, wherein the water is added in an amount to achieve a concentration in the aqueous composition of at least 50% by weight based on a total weight of the aqueous composition.

Clause 10. The method of any of clauses 1-9, wherein the catalyst is added in an amount to achieve a concentration in the aqueous composition in a range of 10 nM to 100 μM of the catalyst.

Clause 11. The method of any of clauses 1-10, wherein the catalyst is added in an amount to achieve a concentration in the aqueous composition in a range of 1 μM to 10 μM of the catalyst.

Clause 12. The method of any of clauses 1-11, wherein the catalyst comprises four N-groups bonded to a metal and each N-group is selected from the group consisting of amide, sulfonamide, and phosphoramide.

Clause 13. The method of clause 12, wherein the catalyst comprises iron, manganese, cobalt, copper, or a combination thereof as the metal.

Clause 14. The method of any of clauses 1-13, wherein the catalyst comprises at least one of the following structures:

-continued

Na⁺;

Na⁺; and

Na⁺.

Clause 15. The method of any of clauses 1-14, further comprising adding an additional reagent to the aqueous composition, wherein the additional reagent is selected from the group consisting of a wetting agent, a surfactant, denaturing agent, co-solvent, and a buffer.

Clause 16. The method of any of clauses 1-15, wherein the aqueous composition is oxidant free prior to applying the voltage.

Clause 17. The method of any of clauses 1-16, wherein during the oxidation, a pH of the aqueous composition is in a range of 4 to 13.

Clause 18. The method of any of clauses 1-17, wherein during the oxidation, a pH of the aqueous composition is in a range of 6 to 8.

Clause 19. The method of any of clauses 1-18, wherein during the oxidation, the aqueous composition is at a temperature in a range of 0° C. to 95° C.

Clause 20. The method of any of clauses 1-19, wherein the electrical voltage is applied to the aqueous composition to achieve a current density in the aqueous composition is in a range of greater than 0 to 500 mA/cm².

Clause 21. The method of any of clauses 1-20, wherein the electrical voltage is applied to the aqueous composition to achieve a current density in the aqueous composition is in a range of greater than 0 mA/cm² to 100 mA/cm².

Clause 22. The method of any of clauses 1-21, wherein the electrical voltage is applied to the aqueous composition to achieve a current density in the aqueous composition is in a range of 1 mA/cm² to 10 mA/cm².

Clause 23. The method of any of clauses 1-22, further comprising introducing the aqueous composition into an electrolysis cell comprising an anode and a cathode, wherein the aqueous composition is disposed in contact with the anode and the cathode, and the electrical voltage is applied across the anode and cathode such that the substrate is oxidized in the presence of the catalyst.

Clause 24. A system for oxidation of a substrate, the system configured to perform the method of any of clauses 1-23.

Clause 25. A system for oxidation of a substrate, the system comprising: an electrolysis cell comprising an anode and a cathode; and a catalyst comprising at least one of the following structures:

Na⁺;

Na⁺;

Na⁺;

Na⁺;

-continued

Na⁺; and

Na⁺.

Reference throughout the specification to "various examples," "some examples," "one example," or "an example", or the like, means that a particular feature, structure, or characteristic described in connection with the example is included in at least one example. Thus, appearances of the phrases "in various examples," "in some examples," "in one example", or "in an example", or the like, in places throughout the specification are not necessarily all referring to the same example. Furthermore, the particular features, structures, or characteristics may be combined in any suitable manner in one or more examples. Thus, the particular features, structures, or characteristics illustrated or described in connection with one example may be combined, in whole or in part, with the features structures, or characteristics of one or more other examples without limitation. Such modifications and variations are intended to be included within the scope of the present examples.

In this specification, unless otherwise indicated, all numerical parameters are to be understood as being prefaced and modified in all instances by the term "about", in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All ranges are inherently described in this specification.

The grammatical articles "a", "an", and "the", as used herein, are intended to include "at least one" or "one or more", unless otherwise indicated, even if "at least one" or "one or more" is expressly used in certain instances. Thus, the articles are used herein to refer to one or more than one (i.e., to "at least one") of the grammatical objects of the article. Further, the use of a singular noun includes the plural, and the use of a plural noun includes the singular, unless the context of the usage requires otherwise.

One skilled in the art will recognize that the herein described compositions, methods, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Whereas particular examples of this invention have been described above for purposes of illustration, it will be evident to those skilled in the art that numerous variations of the details of the present invention may be made without departing from the invention as defined in the appended claims.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

In summary, numerous benefits have been described which result from employing the concepts described herein. The foregoing description of the one or more examples has been presented for purposes of illustration and description. It is not intended to be exhaustive or limiting to the precise form disclosed. Modifications or variations are possible in light of the above teachings. The one or more examples were chosen and described in order to illustrate principles and practical application to thereby enable one of ordinary skill in the art to utilize the various examples and with various modifications as are suited to the particular use contemplated. It is intended that the claims submitted herewith define the overall scope.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed, and not as more narrowly defined by particular illustrative aspects provided herein.

What is claimed is:

1. A method for oxidation of a substrate, the method comprising:
   combining a macrocyclic ligand and metal complex catalyst, an electrolyte, the substrate, and water to form an aqueous composition; and
   applying an electrical voltage to the aqueous composition and oxidizing the substrate in the presence of the catalyst, wherein the catalyst comprises at least one of the following structures:

2. The method of claim 1, wherein the electrolyte is added in an amount to achieve a conductivity in the aqueous composition in a range of 0.1 µS/cm to 100 mS/cm.

3. The method of claim 1, wherein the electrolyte is added in an amount to achieve a conductivity in the aqueous composition in a range of 50 µS/cm to 100 µS/cm.

4. The method of claim 1, wherein the electrolyte comprises a salt.

5. The method of claim 1, wherein the electrolyte comprises a halogen salt, a sulfate salt, a phosphate salt, a nitrate salt, and/or a carbonate salt.

6. The method of claim 1, wherein the electrolyte comprises sodium chloride, sodium sulfate, sodium phosphate, or a combination thereof.

7. The method of claim 1, wherein the substrate comprises organic compounds.

8. The method of claim 1, wherein the substrate comprises inorganic compounds.

9. The method of claim 1, wherein the water is added in an amount to achieve a concentration in the aqueous composition of at least 50% by weight water based on a total weight of the aqueous composition.

10. The method of claim 1, wherein the catalyst is added in an amount to achieve a concentration in the aqueous composition in a range of 10 nM to 100 µM of the catalyst.

11. The method of claim 1, wherein the catalyst is added in an amount to achieve a concentration in the aqueous composition in a range of 1 µM to 10 µM of the catalyst.

12. The method of claim 1, further comprising adding an additional reagent to the aqueous composition, wherein the additional reagent is selected from the group consisting of a wetting agent, a surfactant, denaturing agent, co-solvent, and a buffer.

13. The method of claim 1, wherein the aqueous composition is oxidant free prior to applying the voltage.

14. The method of claim 1, wherein during the oxidation, a pH of the aqueous composition is in a range of 4 to 13.

15. The method of claim 1, wherein during the oxidation, a pH of the aqueous composition is in a range of 6 to 8.

16. The method of claim 1, wherein during the oxidation, the aqueous composition is at a temperature in a range of 0° C. to 95° C.

17. The method of claim 1, wherein the electrical voltage is applied to the aqueous composition to achieve a current density in the aqueous composition in a range of 0 to 100 mA/cm².

18. The method of claim 1, wherein the electrical voltage is applied to the aqueous composition to achieve a current density in the aqueous composition in a range of 0 mA/cm² to 500 mA/cm².

19. The method of claim 1, wherein the electrical voltage is applied to the aqueous composition to achieve a current density in the aqueous composition in a range of 1 mA/cm² to 10 mA/cm².

20. The method of claim 1, further comprising introducing the aqueous composition into an electrolysis cell comprising an anode and a cathode, wherein the aqueous composition is disposed in contact with the anode and the cathode, and the electrical voltage is applied across the anode and cathode such that the substrate is oxidized in the presence of the catalyst.

21. A system for oxidation of a substrate, the system comprising:
    an electrolysis cell comprising an anode and a cathode; and
    a catalyst comprising at least one of the following structures:

* * * * *